United States Patent [19]

Yamamoto

[11] Patent Number: 5,761,373
[45] Date of Patent: Jun. 2, 1998

[54] DEVICE FOR CONTROLLING FORMAT OPERATION OF RECORDING MEDIUM

[75] Inventor: Yasuhiro Yamamoto, Tokyo, Japan

[73] Assignee: Asahi Kogaku Kogyo Kabushiki Kaisha, Tokyo, Japan

[21] Appl. No.: 525,138

[22] Filed: Sep. 8, 1995

[30] Foreign Application Priority Data

Sep. 8, 1994 [JP] Japan .................................. 6-240521

[51] Int. Cl.[6] .............................. H04N 5/781; H04N 5/85
[52] U.S. Cl. ........................................ 386/125; 386/126
[58] Field of Search ..................................... 386/125, 126, 386/127; 369/54, 58, 32, 33; 364/900

[56] References Cited

U.S. PATENT DOCUMENTS

| | | | |
|---|---|---|---|
| 4,513,392 | 4/1985 | Shenk | 364/900 |
| 5,239,382 | 8/1993 | Hatakenaka et al. | 358/335 |
| 5,303,219 | 4/1994 | Kulakowski et al. | 369/56 |
| 5,359,427 | 10/1994 | Sato . | |
| 5,564,011 | 10/1996 | Yammine et al. | 395/182.13 |

FOREIGN PATENT DOCUMENTS 690423  3/1994  Japan .

*Primary Examiner*—Robert Chevalier
*Attorney, Agent, or Firm*—Greenblum & Bernstein, P.L.C.

[57] ABSTRACT

A format operation control device performs a simple format operation and a standard format operation for a recording medium having a control data area, storing file control information, and a record data area, storing record data. The control data area and the record data area have sectors. In the simple format operation, the control data area is initialized and bad sectors are not detected from each of the sectors of the recording medium. The standard format operation includes a substitution process and a bad sector mapping. In the substitution process, the control data area is initialized, bad sectors are detected from each of the sectors of the recording medium, and a physical format is performed so that good sectors are used instead of bad sectors. In a bad sector mapping, the control data area is initialized, bad sectors are detected from the record data area, and a bad mark is recorded in the FAT-table corresponding to the cluster containing the bad sector.

8 Claims, 5 Drawing Sheets

DEVICE FOR CONTROLLING FORMAT OPERATION OF RECORDING MEDIUM

BACKGROUND OF THE INVENTION

1. Field of the Invention

The present invention relates to a device by which a format operation is performed for a recording medium prior to a recording operation, the recording medium being mounted in an electronic still camera to record image data, for example.

2. Description of the Related Art

Conventionally, there is known an electronic still camera which can record digital image data on a hard disk, for example (Japanese Unexamined Patent Publication No. HEI 6-90423). A recording operation onto the hard disk is performed at every sector, and therefore, information for controlling a data file must be stored in a control data area of the hard disk, the file control information including the number of bytes per sector, the number of sectors per track, and the total number of sectors. Before recording image data on the hard disk for the first time, the hard disk must be formatted to initialize the control data area.

In the format operation, it is checked whether or not each sector is bad, and defect processing is performed to prevent data from being recorded on a bad sector. Thus, the format operation takes a predetermined amount of time. Therefore, for example, when a photographer using an electronic still camera mounts a new hard disk in the electronic still camera and intends to record image data on the hard disk right away, the start of the recording operation is delayed by the time necessary for the format operation, which may cause the photographer to miss a shutter chance.

SUMMARY OF THE INVENTION

Therefore, an object of the present invention is to provide a format operation control device by which the time taken for a format operation on a new hard disk can be drastically shortened.

According to the present invention, there is provided a device for controlling a format operation of a recording medium having a control data area, storing file control information, and a record data area, storing record data, both the control data area and the record data area having sectors, the device comprising first format means, second format means and actuating means.

The first format means performs a simple format operation in which the control data area is initialized and bad sectors are not detected from each of the sectors of the recording medium. The second format means performs a standard format operation in which the control data area is initialized and bad sectors are detected at least from the record data area. The actuating means actuates one of the first format means and the second format means.

Further, according to the present invention, there is provided a device for controlling a format operation of a recording medium having a control data area, storing file control information, and an image data area, storing image data, both the control data area and the image data area having sectors, the recording medium having a cluster containing a predetermined number of the sectors, the control data area having a FAT-table, the device being mounted in an electronic still camera, the device comprising first format means, second format means, third format means and actuating means.

The first format means performs a simple format operation in which the control data area is initialized and bad sectors are not detected from each of the sectors of the recording medium. The second format means performs a substitution process in which the control data area is initialized, bad sectors are detected from each of the sectors of the recording medium, and a physical format is performed so that a good sector is used instead of the bad sector. The third format means performs a bad sector mapping in which the control data area is initialized, bad sectors are detected from the record data area, and a bad mark is recorded in the FAT-table corresponding to the cluster containing the bad sector. The actuating means actuates at least one of the first, second and third format means.

Furthermore, according to the present invention, there is provided a device for controlling a format operation of a recording medium having sectors some of which are defined as a control data area storing file control information, the device comprising means for performing a simple format operation in which the control data area is initialized and a bad sector is not detected from each of the sectors of the recording medium.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
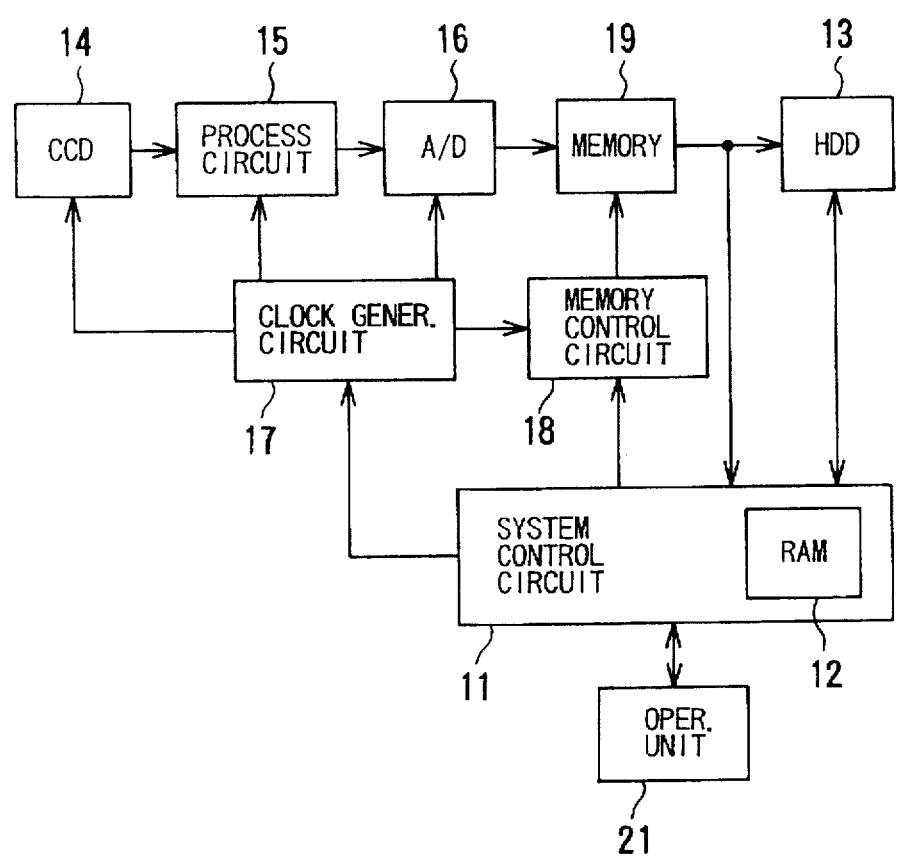
FIG. 1 is a block diagram showing a general construction of an electronic still camera in which a format control device of an embodiment according to the present invention is mounted.

FIG. 1 is a block diagram showing the general construction of an electronic still camera in which a format control device of an embodiment according to the present invention is mounted.

A system control circuit 11 comprises a microcomputer which controls the entire elctronic still camera, and a memory (RAM) 12. In accordance with the control of the system control circuit 11, digital image data is recorded on a hard disk mounted in a hard disk device (HDD) 13, which is detachably disposed in the electronic still camera, and can be mounted in a computer (not shown). Note that commands for reading and writing image data from and onto the hard disk are carried out according to the MS-DOS operating system (a trademark of Microsoft Corporation).

A light beam passing through an optical system (not shown) enters onto a light receiving surface of a solid state imaging device (CCD) 14, so that an image signal corresponding to an object image is generated on the CCD 14. The image signal is subjected to a process, such as a gamma correction, in a process circuit 15, and is converted into a digital signal in an A/D converter 16. The CCD 14, the process circuit 15 and the A/D converter 16 are operated in accordance with a clock signal outputted from a clock generating circuit 17, which generates a clock signal based on the control of the system control circuit 11.

The digital image data is stored in a memory 19 based on the control of a memory control circuit 18, which is operated in accordance with the clock signal generated by the clock generating circuit 17 and performs address control for the memory 19 based on a command signal outputted from the system control circuit 11.

An operation unit 21 has a power switch, a shutter release switch, an operation switch and so on. Controls for controlling a photographing operation, an operation of recording image data onto the hard disk, an operation of formatting the hard disk and so on are carried out in accordance with the operation of the operation unit 21.

Figure 2:
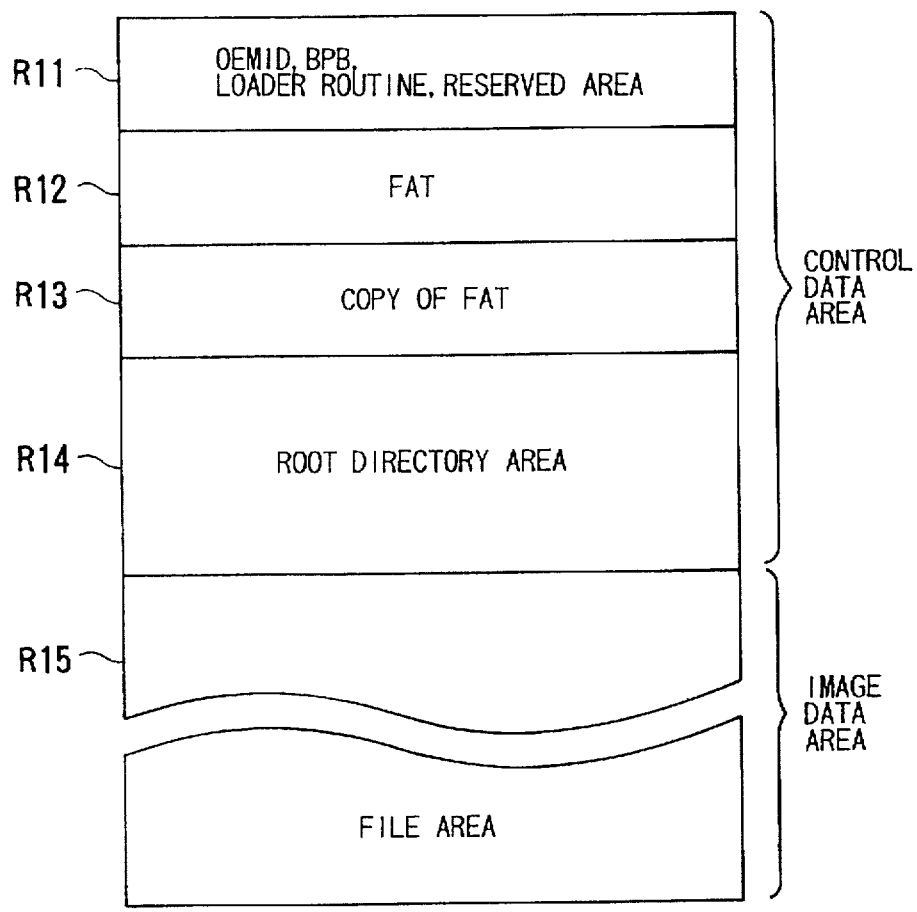
FIG. 2 is a diagram showing a recording area on a hard disk.

FIG. 2 is a diagram showing the file system of MS-DOS, i.e., the arrangement of recording areas on the hard disk. The hard disk has sectors, which are classified as a control data area, storing file control information, and a record data area storing record data.

A file area R15, which is an image data area, has a lot of sectors, wherein four sectors, for example, form one cluster. One image data file is recorded in 100 clusters in this embodiment.

The control data area is composed of a boot sector R11, a first FAT (File Allocation Table) area R12, a second FAT area R13 and a root directory area R14. The boot sector R11 is provided at the head of the recording area of the hard disk, and includes a BPB (Bios Parameter Block) and other areas. The BPB contains a plurality of parameters in accordance with which MS-DOS determines the sizes of the reserved area, the FAT area, the root directory area and the file area. The first FAT area R12 stores a FAT table which is provided for indicating in which clusters one image data file is recorded and in which order the image data is recorded. The second FAT area R13 stores the same FAT table as that of the first FAT table. The root directory area R14 has a lot of directory entries, each of which stores a file name and other data.

Figure 3:
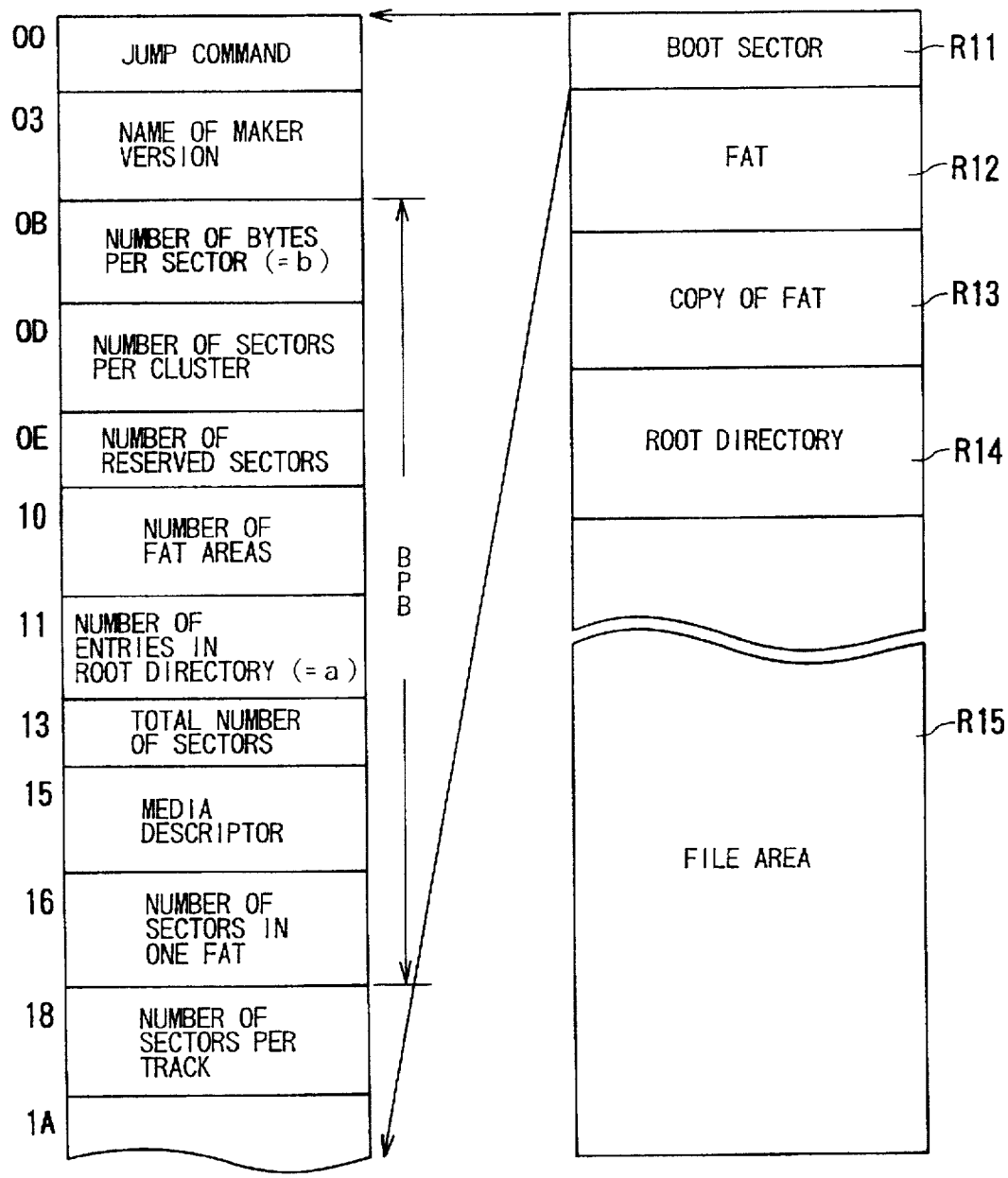
FIG. 3 is a diagram showing information stored in a boot sector.

FIG. 3 shows the contents of the information (boot record) stored in the boot sector R11.

The number of bytes per one sector (512, for example) is stored in address "0B". The number of first FAT and second FAT areas, i.e., 2 is stored in address "10", the number of entries in the root directory R14 is stored in address "11". The number of sectors in each of the FAT areas R12 and R13 is stored in address "16".

The number of sectors "n" of the root directory R14 is obtained by:

$$n = 32 \times a/b$$

wherein the data length of the directory entry is 32 bytes, the number of entries of the root directory is "a", and the number of bytes per sector is "b".

Figure 4:
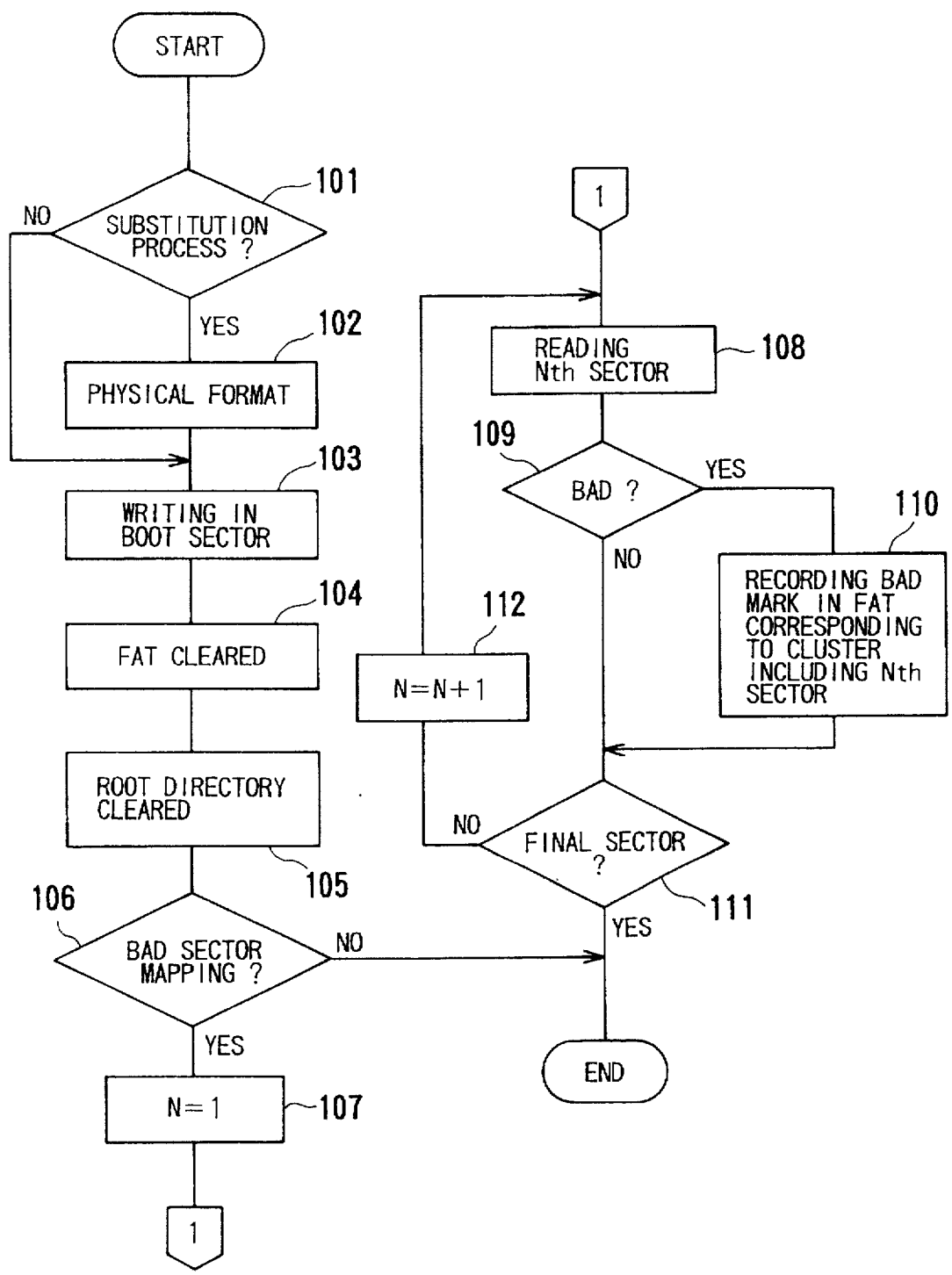
FIG. 4 is a flowchart showing a format operation of the hard disk.

FIG. 4 is a flowchart showing a format operation of the hard disk. The routine shown by the flowchart is controlled based on a command signal generated by handling a switch for the hard disk which is provided in the operation unit 21, and there are three format operations in the embodiment. Namely, by actuating a switch on the operation unit 21, at least one of a simple format operation, a substitution sector process or a bad sector mapping is actuated.

In Step 101, it is determined whether a substitution sector process is to be performed. The substitution sector process is a physical format. In the substitution sector process, bad sectors are detected from each of the sectors of the hard disk and a processing is performed so that good sectors are used instead of bad sectors. This process is performed in Step 102.

When the substitution sector process is not performed, the routine goes from Step 101 to Step 103. When the substitution sector process is performed, the routine is executed in order of Steps 101, 102 and 103. In Step 103, information is written in the boot sector R11 (see FIG. 3). In Step 104, the contents of the FAT tables of the FAT areas R12 and R13 are cleared, and in Step 105, the contents of the root directory R14 are cleared.

In Step 106, it is determined whether a bad sector mapping is performed. In the bad sector mapping, a bad sector is detected from the image data file area and a bad mark is recorded in the FAT-table of the control data area corresponding to the cluster containing the bad sector, all of which are performed in Steps 107 through 112.

When the bad sector mapping is not performed, Steps 107 through 112 are skipped, and thus this routine is ended.

When the bad sector mapping is performed, a counter "N" is set to "1" in Step 107, and then, the contents of Nth sector are read in Step 108. In Step 109, it is determined whether the Nth sector is bad in accordance with the result of reading in Step 108. When the sector is bad, a bad mark (data "FFF7", for example) is recorded in the FAT-table corresponding to the Nth sector in Step 110, and then Step 111 is executed. Conversely, when it is determined in Step 109 that the sector is not bad, the routine goes to Step 111 without executing Step 110.

In Step 111, it is determined whether the sector processed in Steps 108 through 110 is the final sector of the hard disk. If it is not the final sector, the counter "N" is incremented by "1" in Step 112, and then, Steps 108 through 110 are again executed. Conversely, when it is the final sector, this routine is ended.

The format operation of this embodiment generally includes two types of formatting, a simple format operation and a standard format operation. In the standard format operation, not only is a bad sector detected from the sectors of the hard disk, but also a defect process is performed so that record data is not recorded in the bad sector.

In the simple format operation (i.e., a first format operation), Steps 101, 103, 104, 105 and 106 are executed in this order, and the control data area is initialized in Steps 103 through 105, while a bad sector is not detected from each of the sectors of the hard disk. The simple format operation is performed when this operation is selected through the operation unit 21. In the simple format operation, since Step 102, in which the physical format is performed and Steps 107 through 112, in which the bad sector mapping is performed, are skipped, the format operation is carried out very quickly.

In the standard format operation, the control data area is initialized, and a bad sector is detected at least from the image data file area. The standard format operation includes a substitution sector process and a bad sector mapping.

In the substitution sector process (i.e., a second format operation), Steps 101, 102, 103, 104, 105 and 106 are executed in this order, a bad sector is detected from all the sectors of the hard disk, and a physical format is performed so that good sectors are used instead of bad sectors. The substitution sector process is performed when this operation is selected through the operation unit 21. In the substitution sector process, the process goes from Step 101 to Step 102 so that the physical format which is a first defect process is performed, and the process ends when Step 106 is executed so that the bad sector mapping which is a second defect process performed in Steps 107 through 111 is not performed.

In the bad sector mapping (i.e., a third format operation), Steps 101, 103, 104, 105, 106 through 112 are executed in this order, bad sectors are detected from the image data file area, and a bad mark is recorded in the FAT-table corresponding to the cluster containing the bad sector. The bad sector mapping is performed when this operation is selected through the operation unit 21. In the bad sector mapping, the process goes from Step 101 to Step 103 so that the physical format is not performed, and Steps 106 through 112 are executed so that the bad sector mapping is performed.

The first format operation takes the shortest time among all the format operations, and the third format operation takes the longest time among all the format operations.

Figure 5:
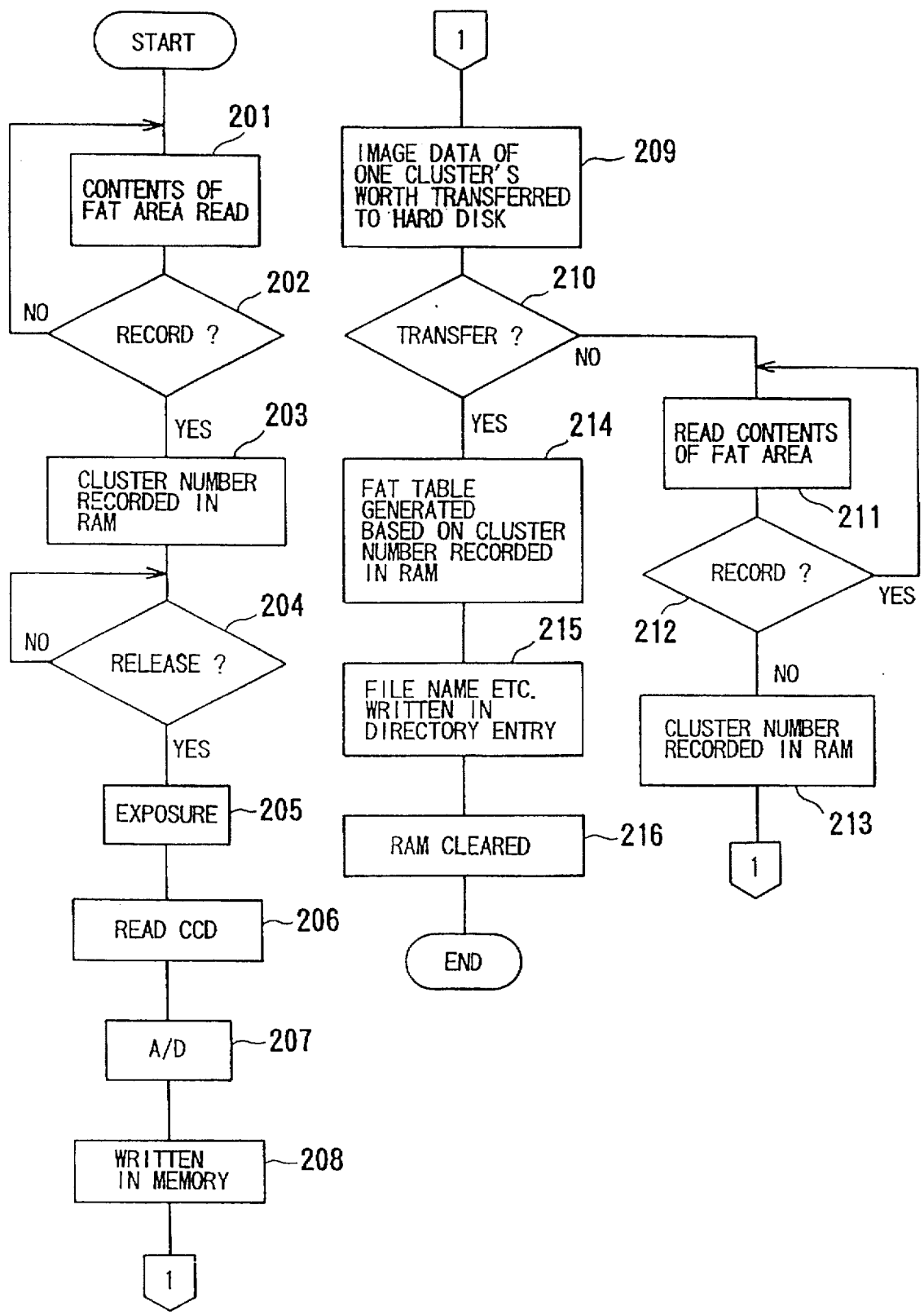
FIG. 5 is a flowchart showing an operation in which image data is written onto the hard disk.

FIG. 5 is a flowchart showing an operation in which image data is written on the hard disk.

In Step 201, the contents stored at a predetermined address of the FAT area R12 are read out. When image data has been recorded in a cluster in the file area corresponding to the address, the stored contents are data ("0003", for example) which shows an address corresponding to the next cluster. Conversely, when image data has not been recorded in a cluster corresponding to the address, the stored contents are data "0000". In Step 202, based on the data read out in Step 201, it is determined whether image data has been recorded in the cluster corresponding to the address. When image data has been recorded, Step 201 is again executed.

Thus, Steps 201 and 202 are repeatedly executed, and during the execution, when a cluster in which image data is not recorded is detected, Step 203 is executed, in which the number of the cluster detected in Step 202 is recorded as the start address number at a relative address "0" in the RAM 12 of the system control circuit 11.

In Step 204, it is determined whether a shutter release has been carried out. When the shutter release has been carried out, the CCD 14 is exposed for a predetermined period in Step 205. In Step 206, the image signal is read out from the CCD 14. The image signal is converted into a digital signal in Step 207, and is written in the memory 19 in Step 208.

In Step 209, the image data is read out from the memory 19, and image data of one cluster's worth is transferred to the hard disk and written in a predetermined cluster of the file area R15. This cluster is the one the number of which was recorded in the RAM 12 in Step 203 when Step 209 was executed for the first time.

In Step 210, it is determined whether the image data of one frame's worth has been transferred to the hard disk. When it is determined that the transfer operation has not been completed, Step 211 is executed in which the contents stored at a predetermined address of the FAT area R12 are read out, similarly to Step 201. Then, in Step 212, based on data read out in Step 211, it is determined whether image data has been recorded in a cluster corresponding to the address. When the image data has been recorded in the cluster, Step 211 is again executed. When a cluster in which image data has been recorded is detected, the number of the cluster is recorded at a predetermined address of the RAM 12 in Step 213.

Then, Step 209 is again executed. Namely, image data of one cluster's worth is transferred from the memory 19 to the hard disk, and is written in the cluster selected in Step 213.

When it is determined in Step 210 that image data of one frame's worth has been transferred to the hard disk, Step 214 is executed in which a FAT table is generated in the FAT area R12 based on the cluster number recorded in the RAM 12. In Step 215, the file name, the time and the date are written in the directory entry. Then, in Step 216, the contents of the RAM 12 are cleared, and this routine is ended.

As described above, in this embodiment, when the hard disk is formatted, in addition to the standard format operation, the simple format operation in which a bad sector is not detected can be selected. This simple format operation is carried out for approximately one second, and therefore, this is very useful when the photographer wants to immediately use a hard disk in which a physical format has been already performed and a logical format for an electronic still camera has not been performed, as for hard disks just bought, for example. Namely, according to the embodiment, the time taken for a format operation can be drastically shortened, the start of a recording operation can be hastened, and the photographer will not miss a shutter chance.

Note that data recorded in the hard disk is not restricted to image data, and may be audio data. Further, the format operation control device according to the present invention can be mounted in a device other than an electronic still camera.

Note that the recording medium need not be restricted to a hard disk, but may also, for example, be a magneto-optical disc.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 6-240521 (filed on Sep. 8, 1994) which is expressly incorporated herein, by reference, in its entirety.

I claim:

1. A device for controlling a format operation of a recording medium having a control data area, storing file control information, and a record data area, storing record data, both of said control data area and said record data area having sectors, said device comprising:

first format means for performing a simple format operation in which said control data area is initialized and bad sectors are not detected from each of said sectors of said recording medium;

second format means for performing a standard format operation in which said control data area is initialized and said bad sectors are detected at least from said record data area; and means for actuating one of said first format means or said second format means.

2. A device according to claim 1, wherein said record data comprises image data obtained by a still video camera.

3. A device according to claim 1, wherein said second format means performs a defect process so that said record data is not recorded in said bad sectors.

4. A device according to claim 3, wherein said defect process comprises a substitution process in which said bad sectors are detected from each of said sectors of said recording medium and a processing is performed so that good sectors are used instead of said bad sectors.

5. A device according to claim 3, wherein said recording medium having a cluster containing a predetermined number of said sectors, said control data area having a FAT-table, and said defect process comprising a bad sector mapping in which said bad sectors are detected from said record data area and a bad mark is recorded in said FAT-table corresponding to said cluster containing any of said bad sectors.

6. A device according to claim 1, wherein said recording medium comprises a hard disk.

7. A device for controlling a format operation of a recording medium having a control data area, storing file control information, and a record data area, storing image data, both of said control data area and said record data area having sectors, said recording medium having clusters containing a predetermined number of said sectors, said control data area having a FAT-table, said device being mounted in an electronic still camera, said device comprising:

first format means for performing a simple format operation in which said control data area is initialized and bad sectors are not detected from each of said sectors of said recording medium;

second format means for performing a substitution process in which said control data area is initialized, said bad sectors are detected from each of said sectors of said recording medium, and a physical format is performed so that good sectors are used instead of said bad sectors;

third format means for performing a bad sector mapping in which said control data area is initialized, said bad sectors are detected from said record data area, and a bad mark is recorded in said FAT-table corresponding to any of said clusters containing said bad sectors; and means for actuating at least one of said first format means, said second format or said third format means.

8. A device for controlling a format operation of a recording medium having a plurality of sectors, some of which are defined as a control data area storing file control information, said device comprising:

a recording medium formatter that performs a format operation, in which said control data area is initialized, while not performing an operation to detect a bad sector for each of said sectors of said recording medium, by writing predetermined information to a boot sector of said recording medium prior to clearing a file allocation table of said recording medium, after which a root directory of said recording medium is cleared.

* * * * *

UNITED STATES PATENT AND TRADEMARK OFFICE
CERTIFICATE OF CORRECTION

PATENT NO. : 5,761,373
DATED : June 2, 1998
INVENTOR(S) : Yasuhiro YAMAMOTO

It is certified that error appears in the above-identified patent and that said Letters Patent is hereby corrected as shown below:

At column 6, line 56 (claim 5, line 2) of the printed patent, change "having" to ---comprises---.

Signed and Sealed this

Second Day of March, 1999

Attest:

Q. TODD DICKINSON

*Attesting Officer*  *Acting Commissioner of Patents and Trademarks*